United States Patent Office 3,170,789
Patented Feb. 23, 1965

3,170,789
NICKEL-BASE ALLOY
Robert M. Woodward and Arthur C. Heitmann, Newark,
Ohio, assignors to Owens-Corning Fiberglas Corporation, a corporation of Delaware
No Drawing. Filed Nov. 16, 1961, Ser. No. 152,909
4 Claims. (Cl. 75—171)

This invention relates to a nickel-base alloy for use at high temperatures. More particularly, the invention relates to an alloy composed primarily of nickel, but including substantial amounts of chromium, tungsten and iron, plus minor amounts of silicon and other elements and a controlled carbon content, and which is particularly suited for apparatus used in the production of glass fibers by a centrifugal process.

Glass fibers can be produced by the so-called "rotary" or centrifugal process, such as illustrated and disclosed by Slayter Patent No. 2,609,566 and other patents. Briefly stated, a rotary fiber forming process involves introducing a molten stream of glass at a temperature above its liquidus into a rotating centrifuge or spinner. The rotating centrifuge has peripheral orifices through which centrifugal force acting upon the rotating mass forces the molten glass to flow in small streams. The streams of glass are usually attenuated into fine fibers.

The spinner or centrifuge may have a generally cylindrical peripheral wall in which the orifices or holes are provided. Economical and practical commercial production rates can be achieved only when there are several thousand of such orifices in the spinner and only when the spinner is rotated at least several thousand revolutions per minute. Such a device operates at a temperature at least as high as 2000° F.

The alloy of the invention is particularly useful in the form of the aforementioned spinners, and is also useful generally in the glass industry for numerous high temperature service applications which require a high resistance to attack by both molten glass and air, a low creep, and a high load carrying ability at high temperatures, including other applications.

It is an object of this invention to provide a new nickel-base alloy which overcomes numerous short-comings and disadvantages of previously known alloys, and which is of particular utility at high temperatures.

It is another object to provide a new nickel-base alloy which is highly resistant to attack by molten glass and air, which has low creep, and which has high load carrying ability at elevated temperatures.

It is still a further object to provide an alloy composed primarily of nickel but including substantial amounts of chromium, tungsten and iron plus minor amounts of silicon and other elements and a limited carbon content. These, and other objects, will be readily apparent from the following detailed description which is intended only to illustrate and disclose the invention.

The nickel-base alloy according to the invention consists essentially of certain balanced amounts of chromium, tungsten, iron, silicon, and carbon, with the balance essentially nickel except for small amounts of certain other elements and minute amounts of impurities. The nickel-base alloy comprises from 26 to 27 percent [1] of chromium, 5 to 6 percent of tungsten, 3 to 4 percent of iron, 1.0 to 1.3 percent of silicon, 0.23 to 0.27 percent of carbon, and the balance essentially nickel. Generally, as much as about 1 percent of manganese also is included to aid in deoxidizing and to control sulfur. Minute amounts of other elements, such as boron, vanadium, aluminum, sulfur, phosphorus, and the like, may be tolerated up to about 0.05 percent of each.

The nickel-base alloy of the invention has a composition upon analysis falling within the broad ranges and preferably about the optimum amounts set forth in the following Table I:

Table I

| Composition | Amount, percent by weight | |
|---|---|---|
| | Broad Range | Optimum |
| Ni | 61–63 | 62 |
| Cr | 26–27 | 26.6 |
| W | 5–6 | 5.55 |
| Fe | 3–4 | 3.3 |
| C | 0.23–0.27 | 0.25 |
| Si | 1.0–1.3 | 1.25 |
| Mn | Up to about 1 | 1.0–1.1 |

The alloy of the invention may be prepared in accordance with recognized present-day melt procedures for nickel-base alloys. Desirably, the constituents used are in a pure state to avoid unwanted constituents and to control carefully the final alloy composition. It is preferred that most constituents be added in the form of relatively pure metals, although compounds or master alloys, such as ferrochromium, ferromanganese, ferrosilicon, and the like, may be used. Preferably the melting is accomplished in a neutral crucible under an argon atmosphere. However, if desired, the charge, when in a molten state, may be protected by a slag of any known type suitable for nickel-base alloys. Other and additional constituents, such as additional charges of chromium, manganese, silicon, and the like, requisite to arrive at the desired alloy composition, then may be added when the melt temperature is about 2700 to 2800° F. Heating is continued and, generally, the melt is betweeen about 2830 and 3000° F. when poured. A suitable scavenger may be added shortly before pouring to impart fluidity to the melt.

A desired article usually is made from the nickel-base alloy of the invention by casting. Such articles may be spinners, centrifuge buckets, bushing support frames, or the like. The alloy, as cast, can be welded and machined.

A specific example of the alloy of the invention was prepared by the method described above. This alloy, by analysis, consisted essentially of 62.06 percent nickel, 26.8 percent chromium, 5.58 percent tungsten, 3.08 percent iron, 0.25 percent carbon, 1.07 percent silicon, and 1.05 percent manganese. The solidus temperature of this alloy was 2460° F. As-cast, it had a Rockwell B hardness of 85–90.

A keyhole notch located to produce a 0.394" by 0.197" break cross section was precisely machined in test specimens for impact tests, and the specimens were tested, with the average results indicated in the following Table II:

Table II

| As Cast | After Heat Treatment, as Indicated | |
|---|---|---|
| | 12 hours at 1,800° F. | 12 hours at 1,800° F. and one hour at 2,250° F. |
| Impact strength, foot pounds, 11.9 | 4.6 | 6.5 |

Corrosion resistance of the alloy was evaluated. In one evaluation, cast bars of the alloy were placed within a heated furnace with about one-half of each bar immersed in bath of molten glass, and, in another, the

---

[1] Unless expressly stated otherwise, all parts and percents herein and in the appended claims are expressed as parts and percents by weight.

bars were completely immersed. In each case, after a specified period of exposure, the bars were removed and measurement made of the extent of corrosive attack. In another evaluation, cast bars were heated in a furnace for a definite time in an air atmosphere, and after such exposure removed and evaluated. A cast bar of the alloy, after immersion for two hours at 2200° F. in a molten glass bath, had an overall weight loss of 0.53 percent, while a cast bar only partially immersed in the molten glass bath for two hours at 2200° F. had a weight loss of 0.79 percent. Cast alloy bars, exposed for about 100 hours in an air atmosphere at about 2200° F., after removal of scale, had a weight loss of 0.82 percent. On the basis of stress rupture curves from 1800° F. to 2100° F. the alloy was vastly superior to AISI 310 stainless steel.[2] At 2050° F., under a 2000 p.s.i.[3] load, the alloy elongated about 25–30 percent.

Spinners for a commercial apparatus employed in producing glass fibers by the rotary process were cast and machined from the alloy described above. These spinners had an average outer diameter of about 8 inches with several thousand stream-forming radial orifices in a vertical, generally cylindrical outer peripheral wall which was approximately 1¼ inches high, and ⅛ to ¼ inch thick. The outer peripheral wall was supported by an upper conical wall which extended inwardly to a suitable means of attachment to a rotating quill of a rotary fiber forming apparatus. No deformation was noted when the spinners were rotated at 5100 r.p.m. at a temperature of 2050° F. As the rotational speed of one was increased to 7500, a slight bulge was observed on the face of the spinner, but no catastrophic failure occurred. When these spinners were placed in commercial service and operated under normal production conditions, a significant increase in service life was realized by comparison with spinners made from the best previously known alloy, and a several fold increase by comparison with spinners from AISI 310 stainless steel.

The alloy of the invention provides a unique combination of desirable characteristics and properties. Preparation and evaluation of a number of experimental alloys containing more and less of the various alloying constituents has established that the particular, specfied, limited and balanced amounts are necessary to realize the advantages of the invention. The superior properties and excellent characteristics of the alloy of the invention are believed to be provided by a unique balancing effect of the amounts of the various constituents therein. Metallographic studies and microstructural analysis of the alloy support this conclusion.

In general, the alloy comprises a dendritic network of complex carbides in an austenitic matrix of nickel, chromium, iron and tungsten. The optimum carbon content for the alloy is about 0.25 percent. At the 0.25 percent carbon level the alloy microstructure exhibits a discontinuous, fine, spherical carbide precipitate uniformly dispersed throughout the grain structure. In contrast thereto, massive primary carbides and long continuous acicular carbide particles are found in the grain boundaries of alloys of somewhat higher carbon content. The carbide phase is not longer present in all the grain boundaries of alloys of somewhat lower carbon content, but, instead, is concentrated at the intersections of the grain boundaries. From studies of the microstructures of experimental alloys of varied carbon contents it is apparent that the specified 0.23 to 0.27 percent carbon content results in the optimum amount of carbide forming elements of iron, chromium and tungsten being retained in the matrix phase of the alloy of the invention to provide mechanical strength and exceptional corrosion resistance at high temperatures. The presence of carbides in the grain structure strengthens the alloy in a manner similar to that of dispersion hardening. Optimum corrosion resistance to molten glass is obtained at the 0.25 percent carbon content where the alloy exhibits the discontinuous, fine spherical carbide precipitate throughout. Higher carbon contents result in significantly increased corrosive attack. The matrix material is self-protecting with respect to air oxidation and relatively impervious to glass attack. However, if massive carbides extend to the surface, complete disintegration of such carbides is a consequence of glass corrosion. If such massive carbides form a continuous network around a matrix grain, that grain can be isolated by corrosion of the carbides and subjected to rapid erosive and corrosive attack on all sides.

Significant alterations in the amounts of the other constituent elements also result in noticeable detriment of some characteristics and properties even though some improvements may be obtained in other respects. A unique combination of characteristics and properties, which are desirable for high-temperature applications requiring mechanical strength and resistance to corrosive attack, is provided by the alloy of the invention.

It will be apparent that various changes and modifications can be made from the specific details set forth herein without departing from the spirit and scope of the attached claims.

What we claim is:

1. An alloy consisting essentially of the following in percentages by weight: 26 to 27 percent of chromium, 5 to 6 percent of tungsten, 3 to 4 percent of iron, 1.0 to 1.3 percent of silicon, 0.23 to 0.27 percent of carbon, and the balance essentially nickel, said alloy being characterized by resistance to attack by molten glass, low creep, and high load carrying ability at elevated temperatures.

2. An alloy consisting essentially of:

| | Percent by weight |
|---|---|
| Nickel | 61–63 |
| Chromium | 26–27 |
| Tungsten | 5–6 |
| Iron | 3–4 |
| Carbon | 0.23–0.27 |
| Silicon | 1.0–1.3 |
| Manganese | 1.0–1.1 | said alloy being characterized by resistance to attack by molten glass, low creep, and high load carrying ability at elevated temperatures.

3. An alloy consisting essentially of the following in percentages by weight: about 62 percent of nickel, 26.6 percent of chromium, 5.55 percent of tungsten, 3.3 percent of iron, 0.25 percent of carbon, 1.25 percent of silicon, and 1.05 percent of manganese, said alloy being characterized by resistance to attack by molten glass, low creep, and high load carrying ability at elevated temperatures.

44. Apparatus adapted for containing molten glass and fabricated from an alloy consisting essentially of the following in percentages by weight: 26 to 27 percent of chromium, 5 to 6 percent of tungsten, 3 to 4 percent of iron, 1.0 to 1.3 percent of silicon, 0.23 to 0.27 percent of carbon, and the balance essentially nickel, said alloy being characterized by resistance to attack by molten glass, low creep, and high load carrying ability at elevated temperatures.

References Cited in the file of this patent

UNITED STATES PATENTS

| | | |
|---|---|---|
| 1,807,554 | Rohn | May 26, 1931 |
| 2,299,871 | Baird | Oct. 27, 1942 |
| 2,403,128 | Scott et al. | July 2, 1946 |
| 2,481,976 | Cape | Sept. 13, 1949 |
| 2,540,107 | English et al. | Feb. 6, 1951 |
| 2,955,934 | Emery | Oct. 11, 1960 |

---

[2] This steel was an alloy comprising 25 percent chromium, 20 percent nickel, 2.0 percent manganese, 1.5 percent silicon, 0.25 percent carbon, and the balance essentially iron.

[3] The term p.s.i. is used to designate pounds per square inch.